Oct. 24, 1961 L. K. PITMAN 3,005,452
NASOLARYNGOSCOPE
Filed Dec. 23, 1957

INVENTOR.
LOUIS K. PITMAN
BY
ATTORNEY.

United States Patent Office 3,005,452
Patented Oct. 24, 1961

3,005,452
NASOLARYNGOSCOPE
Louis K. Pitman, 1749 Grand Concourse, Bronx, N.Y.
Filed Dec. 23, 1957, Ser. No. 704,722
14 Claims. (Cl. 128—11)

This invention relates to medical instruments and is particularly directed to a new and improved nasolaryngoscope.

Previous instruments designed for observation of the larynx have been so constructed as to be usable only through the mouth. However, insertion of the instrument through the mouth has been found inconvenient because of the sensitivity of the throat, causing gagging, and the difficulty of extending a straight probe through the curved oral orifice to a suitable viewing point.

In order to circumvent the disadvantages of oral laryngoscopes, it is an object of this invention to provide a highly improved instrument which may be inserted directly through the nasal passage to illuminate and view the larynx and surrounding areas.

Previous instruments of the type herein described have been usually formed with bent or angled end portions which make insertion difficult. It is an object of this invention to provide a laryngoscope of straight design and of sufficiently small diameter so that it may be inserted through a nasal passage.

Another object of this invention is to provide in an instrument of the type described, the viewing tip comprising an illuminating medium of adjustable intensity and a mirrored prism for deflecting the light downward; and a viewing means provided with a mirrored prism for viewing at an angle, the illuminated portions.

Yet a further object of this invention is to provide an instrument of the type described, wherein the entire illuminating and viewing tip, comprising a pair of prisms, is of sufficiently small dimension as to permit illumination and visualization through a space between the uvula and posterior wall of the pharynx, therefore not to exceed ⅜ of an inch.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown illustrative embodiments of this invention:

Figure 1:
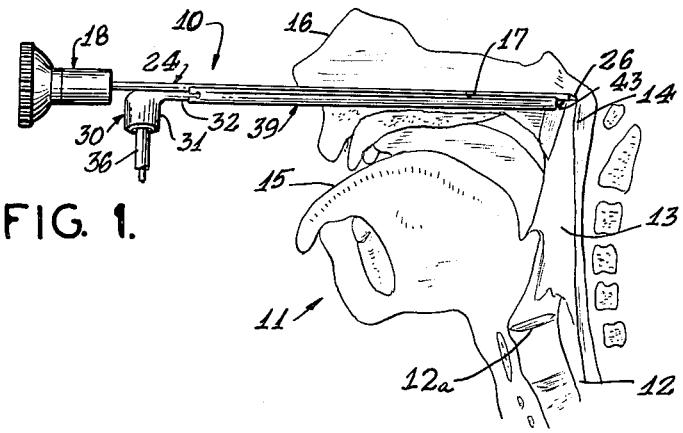
FIG. 1 is a side plan view of an instrument in accordance with the present invention, shown in position as used, the portions of the head illustrated are in cross-section.

Referring now to the drawings in detail, FIG. 1 shows a nasolaryngoscope 10 in position for use in a partially cut-away view of a head 11. The portions of the head illustrated are the esophagus 12, throat 13, larynx 12a, pharynx 14, tongue 15, nose 16, and nasal passage 17.

Figure 2:
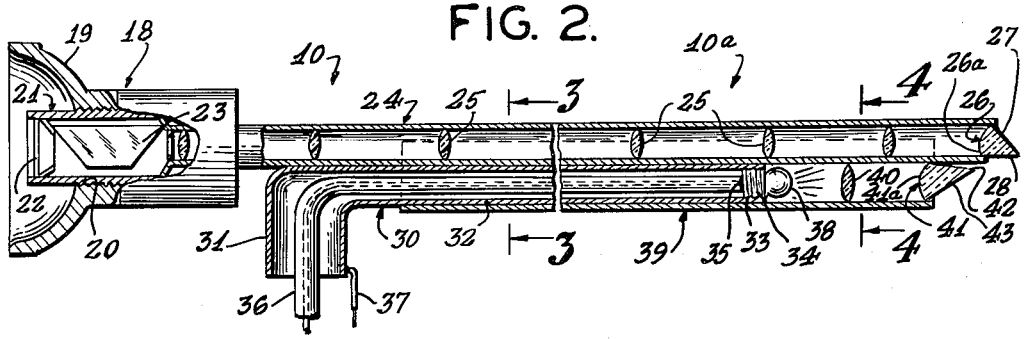
FIG. 2 is a cross-sectional elevation of the instrument of FIG. 1.

FIG. 2 shows the nasolaryngoscope with partially cut-away portions. The laryngoscope comprises a telescope 10a provided with an eyepiece 18 which is formed with a cupped viewing portion 19 at one end. The eyepiece 18 is internally threaded at 20 to receive an externally threaded prism housing 21. Secured within the inner end of the prism housing 21 is a magnifying lens 22 of usual construction. Other well known types of magnification may be used, such as field glass magnifiers and microscope magnifiers. A correcting prism 23 is also retained within the prism housing 21.

Extending forwardly from the prism housing 21 is a lens tube 24. Retained within the lens tube 24 are a number of conveying lenses 25, which are positioned at spaced intervals. Positioned at the forehead end of the lens tube 24 is a prism 26. Prism 26 is formed with a convex lens surface 26a facing the eyepiece of the instrument. The upper surface 27 of prism 26 is angled downwardly and is coated with a mirror surface. A lower surface 28 of the prism 26 extends horizontally between the forward end of surface 27 and the inner surface 26a of the prism.

For the viewing telescope, the total magnification required depends upon the choice of a suitable mirrored prism, objective tube lenses, and eyepiece combination; as now employed in optical instruments.

Abutting the underside of lens-tube 24 is a light carrier 30. Light carrier 30 is formed with a downwardly opening inner end 31 and a forwardly extending tube portion 32. Tube 32 is parallel to tube 24 and formed at the forward end with an internally threaded groove 33. A lamp socket 34 is fixed in the groove 33 and is provided with a positive connection 35. An insulated electric wire 36 extends from connection 35 rearwardly through tube 32 and downwardly out of opening 31. Wire 36 is to be connected to a suitable source of electricity. Fixed in the socket 34 is an electric light bulb 38 which is operated by current flowing through wire 36 to connection 35 through the lamp and then through the socket 34 and is grounded to tube 32.

Figure 3:
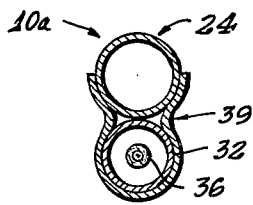
FIG. 3 is a cross-section taken on the line 3—3 of FIG. 2.
Figure 4:
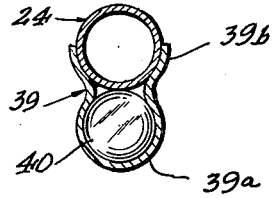
FIG. 4 is a cross-section taken on the line 4—4 of FIG. 2.

A snap-on sleeve 39, shown in cross section FIGS. 3 and 4, has a part cylindrical portion 39a slidably receiving the light-carrying tube 32, and has flaring spring lips 39b resiliently gripping and slidably fitting partially over the lens-carrying tube 24. The light-carrying tube does not extend fully to the forward end of the snap-on sleeve 39. Fixed in the forward end of the snap-on sleeve at a position in front of the electric lamp 38 is a condensor lens 40. Fitted in the forward end of sleeve 39 is a prism 41. Prism 41 has a flat upper surface 42 inclined forwardly and downwardly and has a mirrored finish. The top surface 42 of prism 41 is almost horizontal having a slightly downward inclination or angle, and the lower surface 43 of prism 41 is angled downwardly and rearwardly to meet the lower end of the inner curved prism surface 41a.

Prism 41 is located rearwardly of and below prism 26. Thus, light from bulb 38, passing through condenser lens 40 will pass through the rearward surface of prism 41, and strike the lower surface 43. The light will then be reflected upwardly to the mirrored surface 42. The mirrored surface will strongly reflect the light downwardly into the throat as may be seen in FIG. 1. Reflected light from the area to be viewed will enter prism 26 of the viewer and pass through the carrying lens 25 to the eyepiece 18. Mirrored surfaces 27 and 42 of the prisms are angled at an appropriate degree so as to both reflect on a point corresponding to the average depth to be viewed within the larynx. Light-carrier tube 32 is slidable within the snap-on sleeve 39 so that the light may be concentrated or diffused at will by sliding the tube 32 back and forth within the sleeve 39, so that bulb 38 will move closer to or farther away from the condenser lens 40. The light carrier 30 and the viewing tube 24 may both be slid independently of each other within the snap-on sleeve 39, so that the viewing area may be adjusted by moving the two prisms relative to each other. However, the two prisms 26 and 41 must remain close enough to remain unobscured by the nasal passage 17.

It will now be observed that the reflecting means 26, at one end of the viewing scope, reflects an area or object located at one side thereof through the viewing scope, and that the member 41 serves to illuminate such object or area. The prisms 26 and 41 are at the ends of members 24 and 39, respectively. They are longitudinally offset from one another in contiguous relation, and the angles of the reflecting surfaces are such that the one area is illuminated by member 41 and reflected by member 26. Thus, while members 26 and 41 are longitudinally offset they are close to one another longitudinally.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. An instrument of the type described, comprising an elongated optical viewing member, an eyepiece at one end of said optical viewing member, an angled reflecting prism at the opposite end of said viewing member, a coextensive illuminating means, said illuminating means comprising an elongated member carrying a light source at one end thereof, a sleeve member engaging said viewer and said illuminating means, said viewing means being movable relative to said illuminating means, and said illuminating means being movable with respect to said sleeve member, said sleeve member being provided with an angled reflecting prism at one end thereof, said reflecting prism on said sleeve being positioned so as to reflect light from said illuminating member at an angle relative to said sleeve, and said angle of reflected light being intercepted by the angle of reflection of said reflecting prism of said viewer.

2. A laryngoscope adapted to be inserted through a nasal passage, comprising a viewing means, a coextensive illuminating means and a coextensive sleeve member engaging said viewing means and said illuminating means, said viewing means comprising an elongated tubular member provided with one or more light-carrying lenses therewithin, a prism at one end thereof, said prism formed with a downwardly angled mirrored surface, said illuminating means comprising a tubular member provided with a light source carried at one end thereof, said illuminating means and said viewing means being slidable within said sleeve, said sleeve member being provided with a second prism positioned at one end thereof, said second prism also formed with a downwardly angled mirrored surface.

3. A nasolaryngoscope comprising an elongated viewing scope carrying a reflecting prism at one end thereof, a parallel elongated light-carrying means, and a sleeve, said light-carrying means and said viewing scope received within said sleeve and slidable therewithin relative to each other and relative to the sleeve, said sleeve member carrying a reflecting prism at one end thereof, corresponding to the prism carried by said viewing scope.

4. A nasolaryngoscope comprising an elongated telescope provided with magnifying means at the viewing end thereof, an elongated illuminating means removably attached to said telescope in parallel relation and extending longitudinally of and at the underside of said telescope, said telescope having means at one end to reflect an image of an area disposed at one side of said telescope to the viewing end of the telescope, and means at one end of the illuminating means and longitudinally offset rearwardly from the reflecting means in contiguous relation thereto, to illuminate the area, the image of which is reflected by said reflecting means.

5. The combination of claim 4, wherein the illuminating means is attached to said telescope by a snap sleeve having a portion receiving said illuminating means and portions resiliently gripping said telescope.

6. The combination of claim 5, said illuminating means comprising a tube slidable longitudinally in said snap sleeve, and said snap sleeve being slidable longitudinally on said telescope.

7. The combination of claim 6, said telescope having a viewer at its rear end and a prism at its front end, and a prism on said snap sleeve, disposed forward of said illuminating means tube and rearward of the prism on said telescope.

8. A nasolaryngoscope comprising a telescope provided with an elongated tubular portion, a viewer at one end of said tubular portion, an optical prism at the other end of said tubular portion, a snap sleeve having a part cylindrical portion and flaring spring lips extending therefrom resiliently gripping said tubular portions, a second tube received in said part cylindrical portion of said snap sleeve, a lamp at the forward end of said second tube, and an optical prism at the forward end of said snap sleeve, located rearwardly of the first prism.

9. The combination of claim 8, said prism on said telescope having a top forwardly and downwardly inclined mirrored surface.

10. The combination of claim 9, said prism on said snap sleeve having a top downwardly and forwardly inclined mirrored surface.

11. The combination of claim 10, the inclination of said top surface of said second prism being less than the inclination of the top surface of said first prism.

12. The combination of claim 11, said snap sleeve being slidable on said first tubular portion and said second tubular portion being slidable in said snap sleeve.

13. A nasolaryngoscope comprising a pair of parallel elongated tubular members attached to one another in parallel relation, one above the other, a reflecting prism at the forward end of each of said tubular members, one of said prisms being longitudinally offset rearwardly of said other prism in contiguous relation, a lighting means carried by the one tubular member associated with the said offset prism, said lighting means being movable longitudinally relative to said one tubular member, and telescopic lens elements carried within the other of said tubular members, said prisms having mirrored inclined surfaces arranged so that an area illuminated by the lighting means of said one tubular member may be viewed through the other tubular member.

14. A nasolaryngoscope comprising in combination, an elongated telescope, an elongated illuminating tube, said telescope being mounted above and longitudinally of the illuminating tube, a prism at the forward end of each of said telescope and said illuminating tube, the prism of said illumianting tube being located below and offset rearwardly of said other prism, a lamp and a condensing lens enclosed within said illuminating tube, said condensing lens being located between the lamp and the prism associated with the illuminating tube, said lamp being movable longitudinally with respect to said condensing lens.

References Cited in the file of this patent

UNITED STATES PATENTS

| | | |
|---|---|---|
| 894,306 | Wright | July 28, 1908 |
| 939,034 | Kolb | Nov. 2, 1909 |
| 1,021,809 | Wappler | Apr. 2, 1912 |
| 1,509,041 | Hyams | Sept. 16, 1924 |
| 1,680,491 | Wappler | Aug. 14, 1928 |
| 2,479,237 | Held | Aug. 16, 1949 |
| 2,588,288 | Pohanka | Mar. 4, 1952 |

FOREIGN PATENTS

| | | |
|---|---|---|
| 317,044 | Germany | Dec. 11, 1919 |
| 709,732 | Germany | Aug. 25, 1941 |